US010252636B2

(12) United States Patent
Wada et al.

(10) Patent No.: US 10,252,636 B2
(45) Date of Patent: Apr. 9, 2019

(54) VEHICLE

(71) Applicant: HONDA MOTOR CO., LTD., Tokyo (JP)

(72) Inventors: Shinji Wada, Saitama (JP); Masanori Matsuda, Saitama (JP); Toru Ogaki, Saitama (JP); Yasutomo Kashiwakura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/790,352

(22) Filed: Oct. 23, 2017

(65) Prior Publication Data

US 2018/0111499 A1 Apr. 26, 2018

(30) Foreign Application Priority Data

Oct. 25, 2016 (JP) .................................. 2016-209015

(51) Int. Cl.
*B60K 1/04* (2019.01)
*B60L 11/18* (2006.01)
(Continued)

(52) U.S. Cl.
CPC ............ *B60L 11/1874* (2013.01); *B60K 1/04* (2013.01); *B60K 11/02* (2013.01); *B60K 11/04* (2013.01); *B60L 11/12* (2013.01); *B60L 11/1877* (2013.01); *B60L 11/1879* (2013.01); *B62D 21/157* (2013.01); *B62D 25/20* (2013.01); *B62D 25/24* (2013.01); *H01M 2/1077* (2013.01); *H01M 2/1083* (2013.01);
(Continued)

(58) Field of Classification Search
CPC ............ H01M 10/613; H01M 10/625; H01M 10/6567; H01M 10/6568; H01M 10/6569; B60K 1/04; B60K 2001/0438; B60K 6/405; B60L 11/1874; B60H 1/00278
See application file for complete search history.

(56) References Cited

U.S. PATENT DOCUMENTS 6,230,669 B1* 5/2001 Evans ....................... F01P 3/22
 123/41.42
2008/0295535 A1 12/2008 Robinet et al.
(Continued)

FOREIGN PATENT DOCUMENTS

JP H11-117744 A 4/1999
JP 2001-138753 A 5/2001
(Continued)

OTHER PUBLICATIONS

Jan. 8, 2019, Japanese Office Action issued for related JP Application No. 2016-209015.

*Primary Examiner* — Bryan A Evans
(74) *Attorney, Agent, or Firm* — Paratus Law Group, PLLC

(57) ABSTRACT

A vehicle includes an electric device, a cover which is configured to cover the electric device, and a cooling circuit which is configured to cool the electric device with a refrigerant. An air-venting member is provided in the cooling circuit. A cover through portion is provided in the cover. The air-venting member is disposed to the cover through portion from an inner side of the cover and is configured such that an air discharging operation is performed from an outer side of the cover.

11 Claims, 9 Drawing Sheets

(51) Int. Cl.
  H01M 10/625 (2014.01)
  H01M 10/6568 (2014.01)
  B62D 21/15 (2006.01)
  H01M 2/10 (2006.01)
  H01M 2/12 (2006.01)
  B62D 25/20 (2006.01)
  B62D 25/24 (2006.01)
  B60K 11/02 (2006.01)
  B60K 11/04 (2006.01)
  B60L 11/12 (2006.01)
  H01M 10/613 (2014.01)
  B60K 1/00 (2006.01)
  H01M 2/34 (2006.01)

(52) U.S. Cl.
  CPC ....... *H01M 2/1223* (2013.01); *H01M 10/613* (2015.04); *H01M 10/625* (2015.04); *H01M 10/6568* (2015.04); *B60K 2001/003* (2013.01); *B60K 2001/005* (2013.01); *B60K 2001/0416* (2013.01); *B60K 2001/0422* (2013.01); *B60K 2001/0433* (2013.01); *B60K 2001/0438* (2013.01); *B60L 2210/10* (2013.01); *B60Y 2200/91* (2013.01); *B60Y 2306/01* (2013.01); *H01M 2/34* (2013.01); *H01M 2220/20* (2013.01)

(56) References Cited

U.S. PATENT DOCUMENTS

| | | | |
|---|---|---|---|
| 2010/0055553 A1* | 3/2010 | Kimura | B60K 1/04 429/120 |
| 2013/0202936 A1 | 8/2013 | Kosaki et al. | |
| 2013/0298586 A1* | 11/2013 | Hwang | B60K 1/04 62/239 |
| 2014/0326524 A1 | 11/2014 | Ogushi et al. | |
| 2015/0010782 A1 | 1/2015 | Tanigaki et al. | |

FOREIGN PATENT DOCUMENTS

| | | |
|---|---|---|
| JP | 2002-144888 A | 5/2002 |
| JP | 2005-267888 A | 9/2005 |
| JP | 2009-087646 A | 4/2009 |
| JP | 2010-052563 A | 3/2010 |
| JP | 2012-054054 A | 3/2012 |
| JP | 2012-096716 A | 5/2012 |
| JP | 2013-105687 A | 5/2013 |
| JP | 2013-112225 A | 6/2013 |
| JP | 2013-171663 A | 9/2013 |
| JP | 2013-173389 A | 9/2013 |
| JP | 2015-155672 A | 8/2015 |
| WO | WO 2016/088475 A1 | 6/2016 |

* cited by examiner

VEHICLE

CROSS-REFERENCE TO RELATED APPLICATIONS

The present application claims the benefit of priority of Japanese Patent Application No. 2016-209015, filed on Oct. 25, 2016, the content of which is incorporated herein by reference.

TECHNICAL FIELD

The present invention relates to a vehicle on which an electric device such as a battery is mounted.

BACKGROUND ART

In a hybrid vehicle or the like, it is necessary to provide a cooling circuit for cooling an electric device such as a battery by cooling water. For example, JP-A-1111-117744 discloses a hybrid electric vehicle which includes a cooling circuit for cooling an electric generator, an inverter, a motor for running and auxiliary devices such as an air compressor and an air conditioning unit by cooling water circulated with a water pump, wherein a sub-tank for storing reserve cooling water is connected to the cooling circuit, and an air piping for introducing compressed air from a compressed air source is connected to an air-venting hole of the sub-tank via a solenoid valve.

SUMMARY

In the cooling circuit disclosed in JP-H11-117744, it is necessary to provide the sub-tank and the solenoid valve, and therefore, the number of components is larger and it is complicated to control the solenoid valve and perform an air discharging operation or the like. In the cooling circuit far cooling the electric device, it is preferable that the air discharging operation can be easily performed and replacement or maintenance of the electric device can be easily performed.

The present invention has been made in view of the above circumstances, and an object thereof is to provide a vehicle capable of easily performing an air discharging operation in a cooling circuit and replacement or maintenance of an electric device.

(1) According to an aspect of the present invention, there is provided a vehicle (for example, a vehicle V in an embodiment described below) including:

an electric device (for example, a battery 30 in the embodiment);

a cover (for example, a cover 52 in the embodiment) which is configured to cover the electric device; and a cooling circuit (for example, a cooling circuit 100 in the embodiment) which is configured to cool the electric equipment with a refrigerant, wherein an air-venting member (for example, an air-venting bolt 81 in the embodiment) is provided in the cooling circuit, wherein a cover through portion (for example, a cover through hole 52c in the embodiment) is provided in the cover, and wherein the air-venting member is disposed to the cover though portion from an inner side of the cover and is configured such that an air discharging operation is performed from an outer side of the cover.

(2) In the above vehicle the air-venting member may be supported by a stay (for example, a stay 82 in the embodiment), and a seal member (for example, a seal member 86 in the embodiment) may be provided between the stay and the cover.

(3) In the above vehicle the electric equipment may be disposed below a floor panel (for example, a floor panel 3 in the embodiment), the floor panel may be formed with a panel opening portion (for example, a first panel opening portion 3a in the embodiment), a maintenance inspection plug (for example, a first maintenance inspection plug 31p and a second maintenance inspection plug 32p in the embodiment) for blocking electricity input and output of the electric device may be provided adjacent to the air-venting member, and the air-venting member and the maintenance inspection plug may be operable though the panel opening portion.

(4) In the above vehicle, the air-venting member may be disposed below a rear seat (for example, a rear seat 5 in the embodiment) at a vehicle width center part.

(5) In the above vehicle, the air-venting member may be disposed at a highest position in the cooling circuit.

(6) In the above vehicle, an air-venting piping (for example, an air-venting piping 84 in the embodiment) connected to the air-venting member may be connected to an air-venting flow path (for example, an air-venting flow path 83 in the embodiment) branching off from the cooling circuit, and a flow rate of a connection portion (for example, a connection portion 85 in the embodiment) of the air-venting piping and the air-venting flow path may be smaller than those of flow paths at an upstream side and a downstream side of the connection portion.

(7) In the above vehicle, an air-venting piping (for example, an air-venting piping 84 in the embodiment) connected to the air-venting member may be connected to an air-venting flow path (for example, an air-venting flow path 83 in the embodiment) branching off from the cooling circuit, and the air-venting piping may be positioned by a positioning portion (for example, a positioning portion 40b in the embodiment) provided on another electric device (for example, a battery ECU 40 in the embodiment) covered by the cover.

(8) In the above vehicle, the electric device may include a first module group (for example, a front module group 31 in the embodiment) having a plurality of battery modules (for example, battery modules 30a in the embodiment), and a second module group (for example, a middle module group 32 in the embodiment) having a plurality of battery modules (for example, battery modules 30a in the embodiment), the first module group, the second module group, and a battery case (for example, a case 50 in the embodiment) for accommodating the first module group and the second module group may configure a battery unit (for example, a first battery unit 10 in the embodiment), the battery case may include a bottom plate (for example, a bottom plate 51 in the embodiment) on which the first module group and the second module group are mounted, and a unit cover (for example, a cover 52 in the embodiment) which is configured to cover the bottom plate from above, the cover may be the unit cover, and the battery unit may be disposed below a floor panel.

(9) In the above vehicle, the cooling circuit may include a cooling internal piping (for example, an internal piping 104 in the embodiment) provided inside the battery unit, and a cooling external piping (for example, an external piping 103 in the embodiment) provided outside the battery unit, at least a part of the cooling external piping may be disposed at one vehicle width side of the battery unit, and the cooling external piping may not be provided at another vehicle width side of the battery unit.

(10) in the above vehicle, an exhaust pipe may be provided at the other vehicle width side of the battery unit.

(11) in the above vehicle, a high-voltage equipment (for example, a DC-DC converter 22 in the embodiment) and a high-voltage wiring for connecting the high-voltage equipment to the first module group and the second module group may be provided in the battery unit, and the high-voltage equipment and the high-voltage wiring may be disposed at a vehicle width center of the battery unit.

Effects

According to an aspect of (1), air accumulated in the cooling circuit can be discharged easily by an operation from the outer side of the cover via the air-venting member.

Since the air-venting member is provided to the cover from the inner side of the cover, in replacement or maintenance of the electric device, the cover can be removed and the electric device can be easily accessed in a state where the air-venting member is mounted in the cooling circuit.

According to an aspect of (2), since the seal member is provided between the stay for supporting the air-venting member and the cover, the electric device can be prevented from being wet even if the refrigerant is scattered during air discharging.

According to an aspect of (3), since the air-venting member is disposed adjacent to the maintenance inspection plug, air can be discharged and the electricity input and output of the electric equipment can be blocked from one panel opening portion.

According to an aspect of (4), the air-venting member and the maintenance inspection plug can be easily accessed by removing the rear seat.

According to an aspect of (5), since the air-venting member is disposed at the highest position in the cooling circuit, the air in the cooling circuit can be efficiently collected in the air-venting piping.

According to an aspect of (6), since the flow rate of the connection portion of the air-venting piping and the air-venting flow path is smaller than those of the flow paths at the upstream side and the downstream side of the connection portion, it is possible to reduce flow of air having entered the cooling circuit passing through the air-venting piping with the flow of the refrigerant in the cooling circuit.

According to an aspect of (7), since the air-venting piping is positioned by the positioning portion which is provided on another electric device covered by the cover, the air-venting piping can be easily disposed, and workability is improved.

According to an aspect of (8), since the air-venting member is provided in the cooling circuit of the battery, deterioration in cooling performance of the battery can be prevented. Since the air-venting member along with batteries (the first module group and the second module group) is accommodated in the battery case, handling capability of the air-venting member is excellent. Further, since the battery unit is disposed below the floor panel, a wide space can be ensured in a passenger compartment. Since the cooling circuit is independent of the passenger compartment, the design suitable for respective function can be made.

According to an aspect of (9), since the cooling external piping is disposed at the one vehicle width side of the battery unit, the piping can be assembled easily.

According to an aspect of (10), since the cooling external piping is disposed at a side opposite to the exhaust pipe in the vehicle width direction of the battery unit, an influence of heat caused by the exhaust pipe can be reduced.

According to an aspect of (11), since the high-voltage equipment and the high-voltage wiring are disposed at the vehicle width center of the battery unit, the high-voltage equipment and the high-voltage wiring can be protected from an impact at a side collision. Since the high-voltage equipment and the high-voltage wiring are away from the cooling external piping disposed at the one vehicle width side of the battery unit, the high-voltage equipment and the high-voltage wiring can also be protected from being wet.

DETAILED DESCRIPTION OF EMBODIMENT

Figure 1:
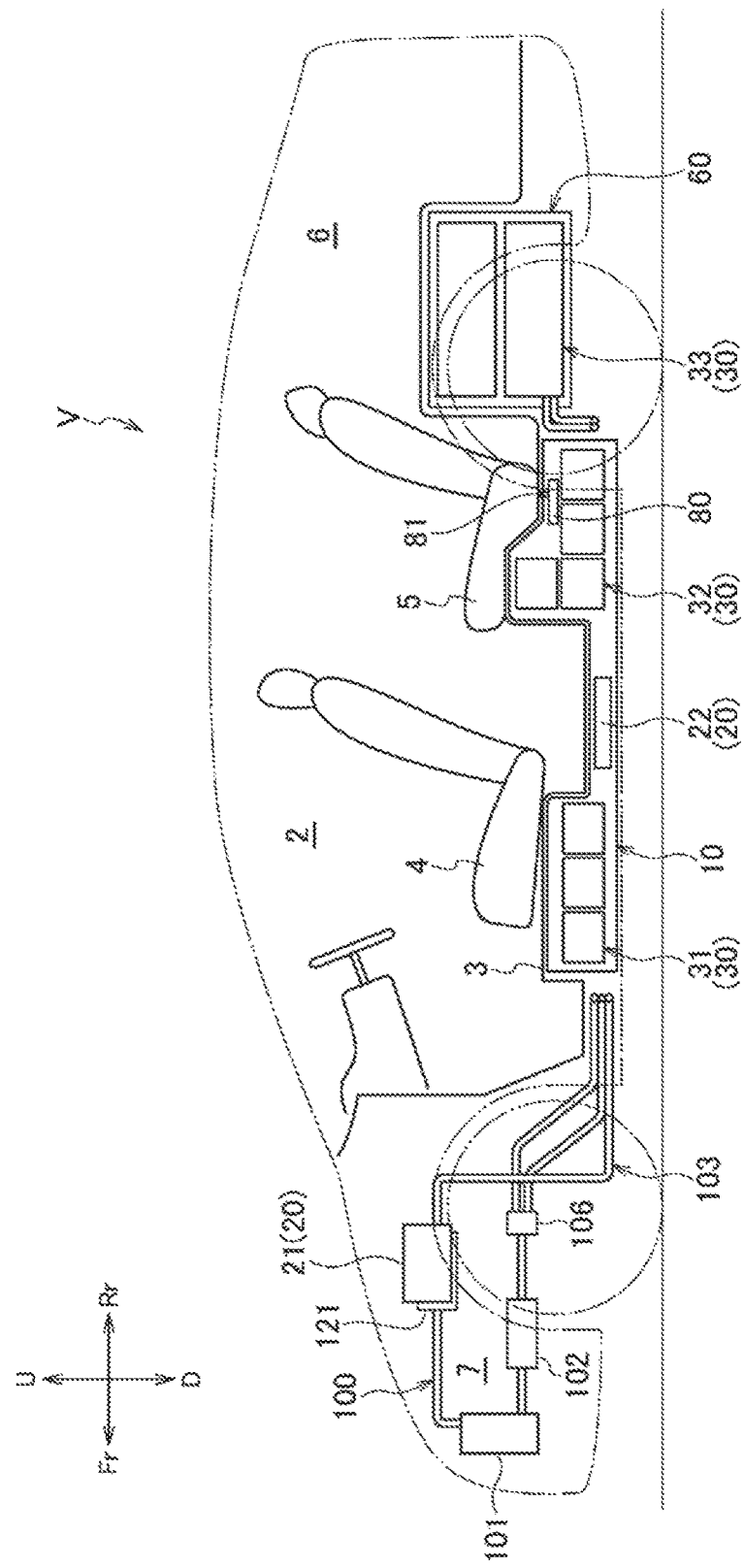
FIG. 1 is a schematic side view of a vehicle according to an embodiment of the present invention.

Hereinafter, an embodiment of the present invention will be described based on the accompanying drawings. The drawings should be seen in a direction in which reference numerals appear normal.

[Vehicle]

As shown in FIG. 1, a vehicle V according to an embodiment of the present invention is a hybrid vehicle, an electric vehicle, a fuel cell vehicle or the like, in which a vehicle drive motor (not shown) is mounted at front. The vehicle V mainly includes a battery 30, a high-voltage equipment 20, and a cooling circuit 100 for cooling these constituent components.

[Battery]

The battery 30 includes a front module group 31, a middle module group 32, and a rear module group 33 which are disposed separately from each other. A plurality of battery modules 30a in which a plurality of battery cells are stacked in a cuboid shape are disposed collectively in each of the module groups 31 to 33.

Figure 2:
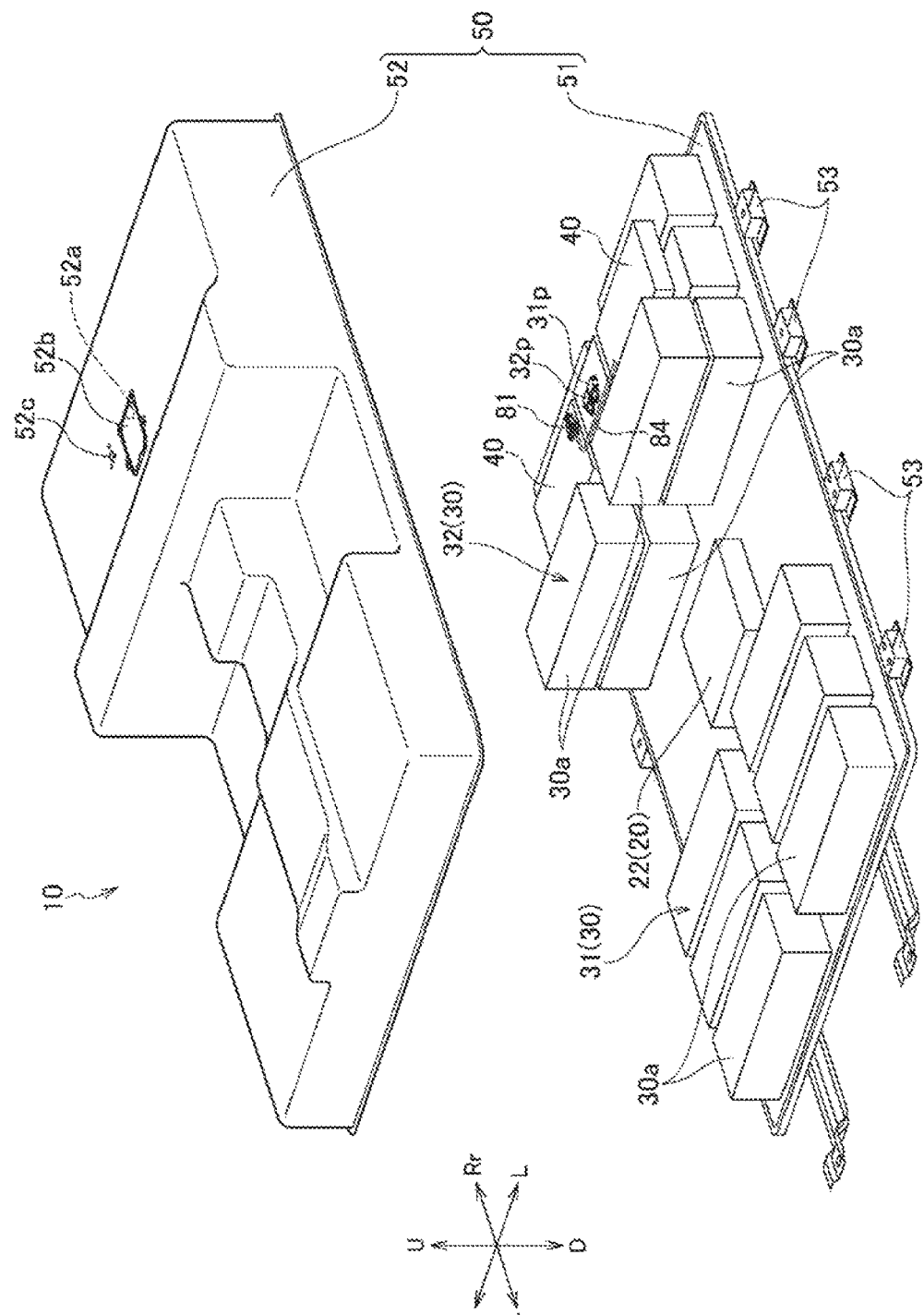
FIG. 2 is an exploded perspective view schematically showing a first battery unit mounted on the vehicle Shown in FIG. 1.
Figure 3:
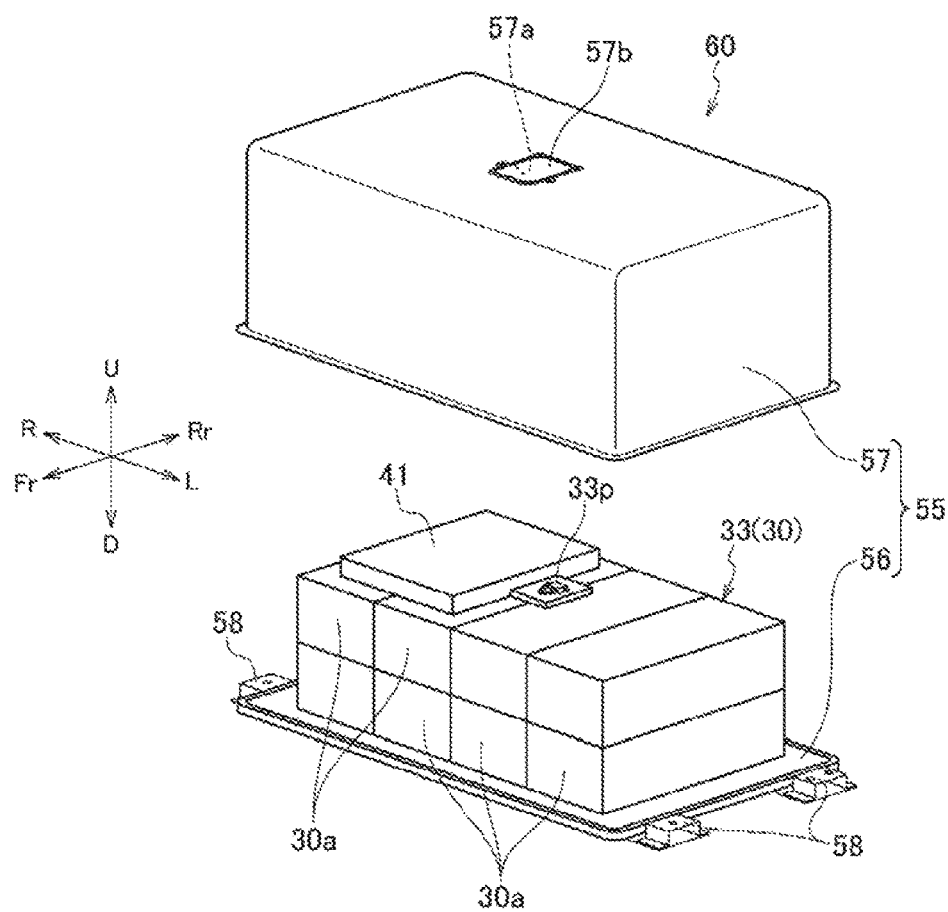
FIG. 3 is an exploded perspective view schematically showing a second battery unit mounted on the vehicle shown in FIG. 1.

Specifically, as shown in FIG. 2, the front module group 31 includes a total of six battery modules 30a which are arranged two in a left-right direction and three in a front-rear direction, while a longitudinal direction of each battery module 30a is directed in the left-right direction (a vehicle width direction). As shown in FIG. 2, the middle module group 32 includes a total of eight battery modules 30a in which six battery modules 30a are arranged two in the left-right direction and three in the front-rear direction, and additional two battery modules 30a are respectively disposed on the two battery modules 30a in a frontmost row in the left-right direction, while a longitudinal direction of each battery module 30a is directed in the left-right direction (the vehicle width direction). As shown in FIG. 3, the rear module group 33 includes a total of eight battery modules 30a in which four battery modules 30a are arranged in the left-right direction, and additional four battery modules 30a are respectively disposed on the four battery modules 30a, while a longitudinal direction of each battery module 30a is directed in the front-rear direction.

[High-Voltage Equipment]

The high-voltage equipment 20 includes a charger 21 and a DC-DC converter 22. The charger 21 is a high-voltage equipment which charges the battery 30 with electric power supplied from an external power source, and the DC-DC converter 22 is a high-voltage equipment which converts direct current power. The charger 21 and the DC-DC converter 22 are more heat-resistant than the battery 30, and control temperatures thereof are set higher than that of the battery 30. For example, an upper limit temperature of the high-voltage battery 30 is set at 60° C., upper limit temperatures of the charger 21 and the DC-DC converter 22 are set at 80° C., and therefore, under a high-temperature environment, the battery 30 needs to be cooled in higher priority than the charger 21 and the DC-DC converter 22. Incidentally, the charger 21 becomes higher temperature in charging, there may be a situation where the battery 30 does not need to be cooled, and only the charger 21 and the DC-DC converter 22 need to be cooled.

[First Battery Unit]

Figure 4:
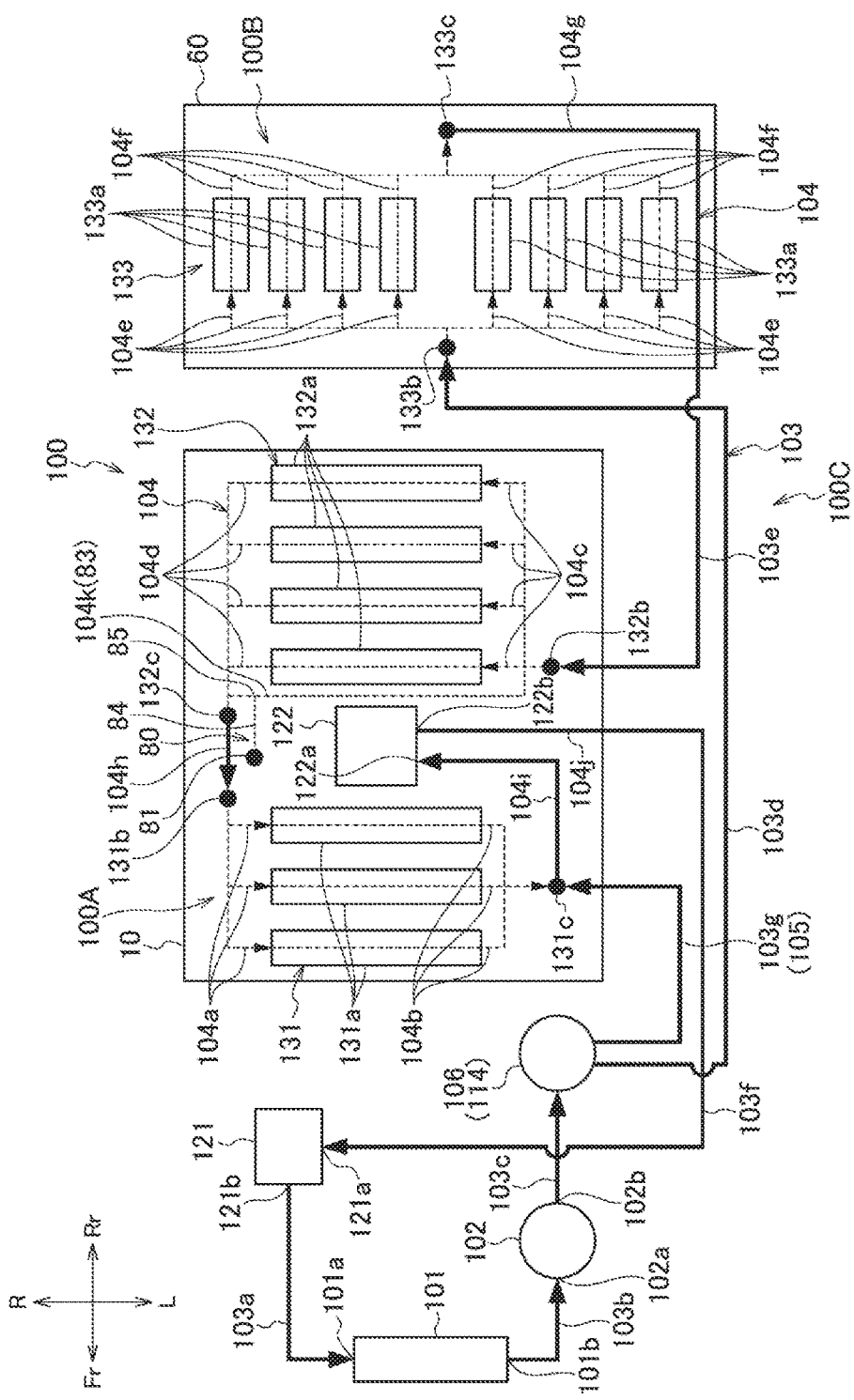
FIG. 4 is a circuit diagram showing a configuration of a cooling circuit mounted on the vehicle shown in FIG. 1.

As shown in FIGS. 1 and 2, the front module group 31, the middle module group 32, the DC-DC converter 22, a part of the cooling circuit 100 (hereinafter, also referred to as an interior cooling circuit 100A), and a case 50 for accommodating those constituent components are unitized to configure a first battery unit 10, which is disposed below a floor panel 3 forming a floor surface of a passenger compartment 2. The interior cooling circuit 100A is shown in FIG. 4.

The case 50 includes a bottom plate 51 on which the front module group 31, the middle module group 32, and the DC-DC converter 22 are mounted, and a cover 52 which covers those constituent components from above. A plurality of brackets 53 which extend in the left-right direction below the bottom plate 51 are fastened to bottom faces of a pair of floor frames (not shown) from below which are provided parallel to an inner of side sills provided on both sides of the vehicle V, so that the first battery unit 10 is installed below the floor panel 3.

Accordingly, the first battery unit 10 is fixed to the floor frames (not shown), so that the front module group 31 is disposed below a front seat 4 and the middle module group 32 is disposed below a rear seat 5. The battery modules 30a in the frontmost row of the middle module group 32 in which two battery modules 30a are disposed to be overlapped are located under a front portion of a seat cushion of the rear seat 5. The DC-DC converter 22 is disposed between the front module group 31 and the middle module group 32 at a vehicle width center of the first battery unit 10. A high-voltage wiring (not shown) for connecting the front module group 31 and the middle module group 32 to the DC-DC converter 22 is also disposed at the vehicle width center of the first battery unit 10. Left and right battery ECUs 40 are disposed on the battery modules 30a in a second row and a third row from the front of the middle module group 32. The battery ECUs 40 are battery controllers which control the charging, discharging and temperatures of the front module group 31 and the middle module group 32.

Figure 8:
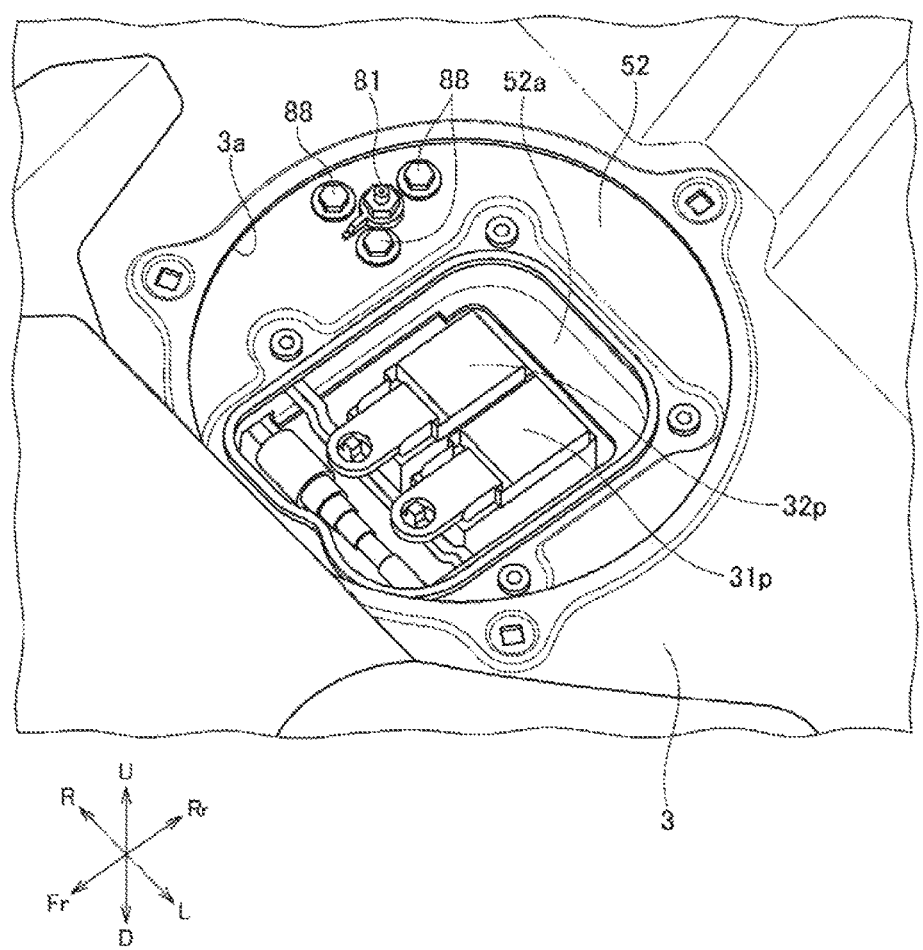
FIG. 8 is a perspective view of the first cover opening portion from which a maintenance lid of the cover is removed.

Between the left and right battery ECUs 4, a first maintenance inspection plug 31p for blocking electricity input and output of the front module group 31 and a second maintenance inspection plug 32p for blocking electricity input and output of the middle module group 32 are adjacently disposed in the left-right direction. An air-venting bolt 81 and a stay 82 for supporting the air-venting bolt 81 (described below) are disposed on the right battery ECU 40 so as to be adjacent to the first maintenance inspection plug 31p and the second maintenance inspection plug 32p. As shown in FIGS. 2 and 8, the cover 52 is formed with a first cover opening portion 52a such that the first maintenance inspection plug 31p and the second maintenance inspection plug 32p are operable from outside. The first cover opening portion 52a is sealed by a maintenance lid 52b at a time other than maintenance.

Figure 6:
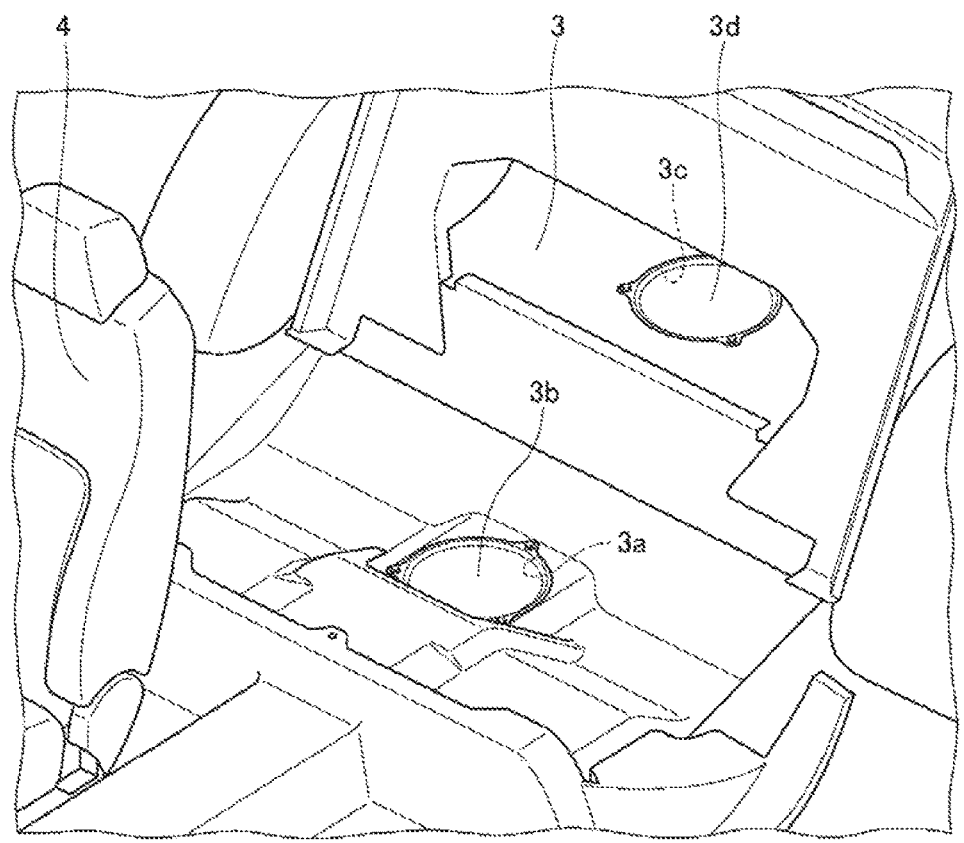
FIG. 6 is a perspective view showing a first panel opening portion and a second panel opening portion viewed obliquely from a top of a floor panel.
Figure 7:
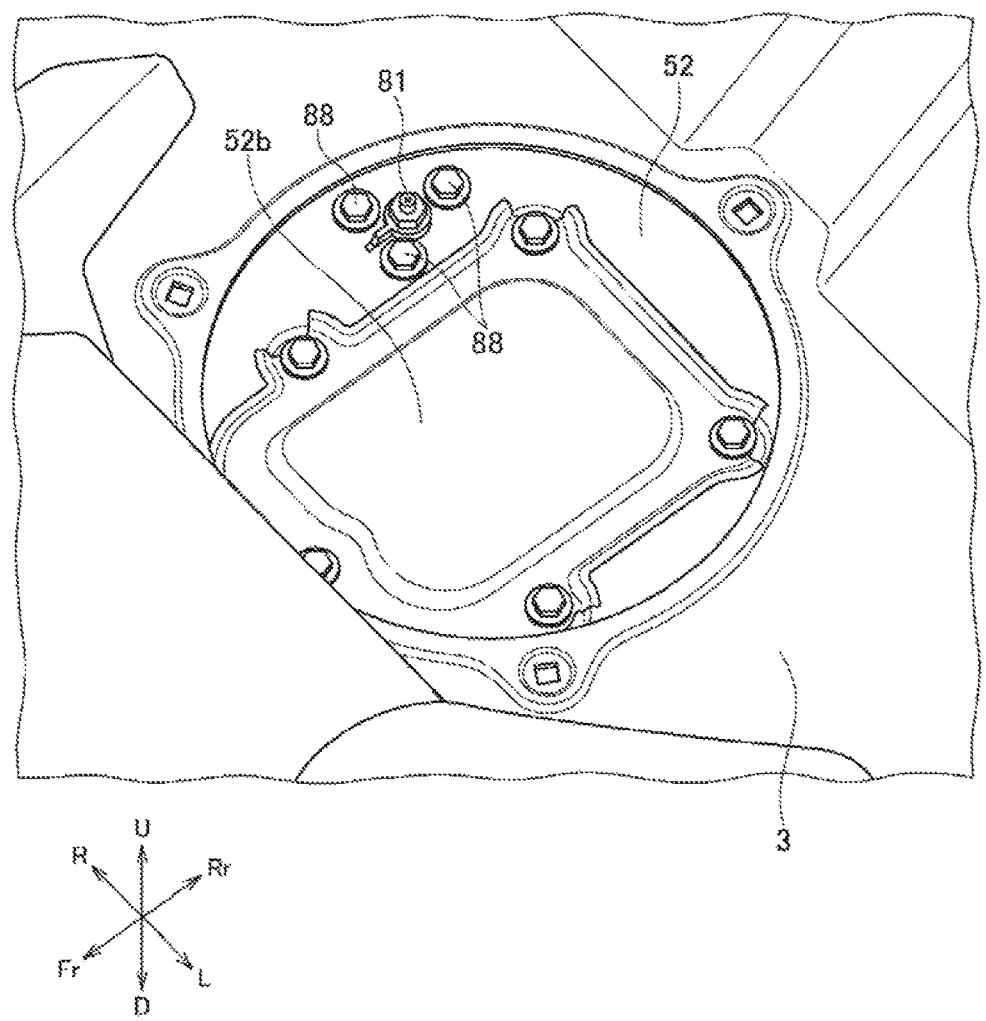
FIG. 7 is a perspective view of the first panel opening portion from which a maintenance lid of the floor panel is removed.

As shown in FIGS. 6 to 8, the floor panel 3 is formed with a first panel opening portion 3a at a position corresponding to the first cover opening portion 52a (the maintenance lid 52b) of the cover 52, that is, below the rear seat 5. Incidentally, the first panel opening portion 3a is also sealed by a maintenance lid 3b at a time other than maintenance. Therefore, in maintenance, the rear seat 5 is removed and the two maintenance lids 3b and 52b are opened, so that the electricity input and output of the front module group 31 and the middle module group 32 can be blocked from the passenger compartment 2.

[Second Battery Unit]

As shown in FIGS. 1 and 3, the rear module group 33, a part of the cooling circuit 100 (hereinafter, also referred to as an interior cooling circuit 100B), and a case 55 for accommodating those constituent components are unitized to configure a second battery unit 60, which is disposed below the floor panel 3 forming the floor surface of a luggage compartment 6. The internal cooling circuit 100B is shown in FIG. 4.

The case 55 includes a bottom plate 56 on which the rear module group 33 is mounted, and a cover 57 which covers the rear module group 33 from above. A plurality of brackets 58 which extend in the left-right direction below the bottom plate 56 are fastened to rear frames (not shown) which are formed to surround the second battery unit 60, and the rear frames are fastened to rear side members (not shown), that the second battery unit 60 is installed below the floor panel 3.

Accordingly, the second battery unit 60 is fixed to the rear side members (not shown), so that the rear module group 33 is disposed below the luggage compartment 6. A battery ECU 41 is disposed on the battery modules 30a of the rear module group 33. The battery ECU 41 is a battery controller which controls the charging, discharging and temperature of the rear module group 33.

A third maintenance inspection plug 33p for blocking electricity input and output of the rear module group 33 is disposed adjacent to the battery ECU 41. As shown in FIG. 3, the cover 57 is formed with a second cover opening portion 57a such that the third maintenance inspection plug 33*p* is operable from outside. The second cover opening portion 57*a* is sealed by a maintenance lid 57*b* at a time other than maintenance.

As shown in FIG. 6, the floor panel 3 is formed with a second panel opening portion 3*c* is provided at a position corresponding to the second cover opening portion 57*a* (the maintenance lid 57*b*) of the cover 57, that is, below the luggage compartment 6. Incidentally, the second panel opening portion 3*c* is also sealed by a maintenance lid 3*d* at a time other maintenance. Therefore, in maintenance, a floor mat of the passenger compartment 2 is turned over and the two maintenance lids 3*d* and 57*b* are opened, so that the electricity input and output of the rear module group 33 can be blocked from the luggage compartment 6.

[Configuration of Cooling Circuit]

A radiator 101 and a cooling pump 102 which configure the cooling circuit 100 are disposed in a so-called engine room 7 at the front of the first battery unit 10 along with a motor for driving the vehicle (not shown) and the charger 21 which are connected to the battery 30. The cooling circuit 100 is divided into the interior cooling circuit 100A disposed inside the first battery unit 10, the interior cooling circuit 100B disposed inside the second battery unit 60, and an exterior cooling circuit 100C disposed outside the first battery unit 10 and the second battery unit 60.

Figure 5:
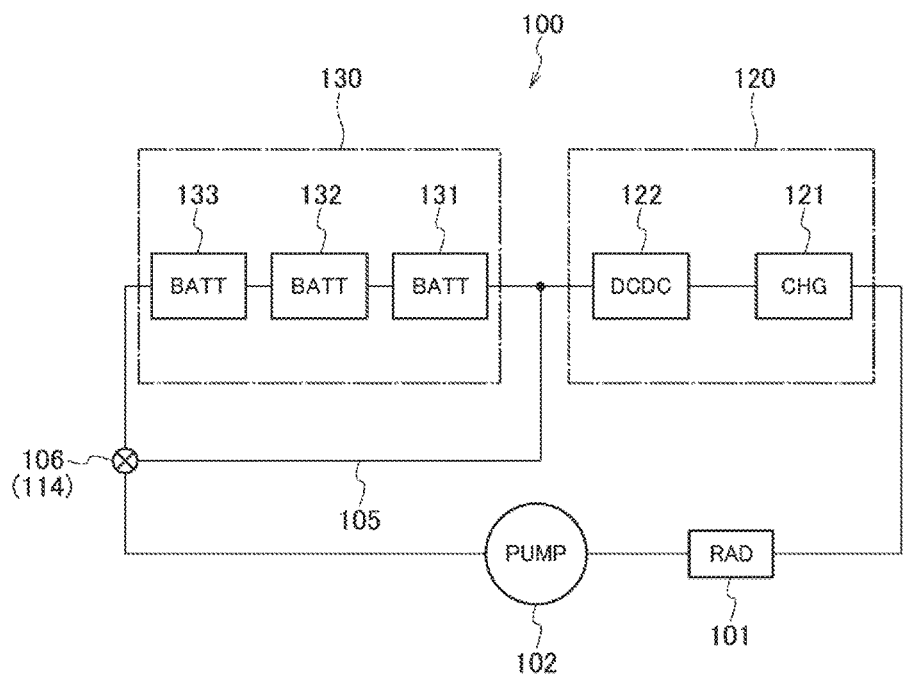
FIG. 5 is a schematic block diagram of the cooling circuit shown in FIG. 4.

As shown in FIGS. 4 and 5, in the cooling circuit 100, the radiator 101, the cooling pump 102, a battery cooling unit 130, a DC-DC converter cooling unit 122, and a charger cooling unit 121 are connected in series by an external piping 103 which is disposed outside the first battery unit 10 and the second battery unit 60, and an internal piping 104 which is disposed inside the first battery unit 10 and the second battery unit 60, so that a refrigerant circulation path is formed.

As shown in FIG. 4, the radiator 101 radiates heat of a refrigerant which flows in from an inlet port 101*a* and discharges the refrigerant which is cooled by the heat radiation from an outlet port 101*b*. The inlet port 101*a* of the radiator 101 is connected to an outlet port 121*b* of the charger cooling unit 121 via a first external piping 103*a*. The outlet port 101*b* of the radiator 101 is connected to a suction port 102*a* of the cooling pump 102 via a second external piping 103*b*.

The cooling pump 102 discharges the refrigerant suctioned in from the suction port 102*a* from a discharge port 102*b* according to a driving of an electric motor (not shown). The discharge port 102*b* of the cooling pump 102 is connected to an inlet port 133*b* of the rear module group 133 described below, which is an inlet port of the battery cooling unit 130, via a third external piping 103*c* and a fourth external piping 103*d*.

The battery cooling unit 130 includes a plurality of module group cooling units 131 to 133 for respectively cooling the plurality of module groups 31 to 33. A front module group cooling unit 131 for cooling the front module group 31 is configured such that cooling jackets 131*a* for cooling each set of two battery modules 30*a* arranged in the left-right direction are arranged three in the front-rear direction, upstream sides of these cooling jackets 131*a* are connected in parallel via a first internal piping 104*a*, and downstream sides of these cooling jackets 131*a* are connected in parallel via a second internal piping 104*b*.

A middle module group cooling unit 132 for cooling the middle module group 32 is configured such that cooling jackets 132*a* for cooling each set of two battery modules 30*a* arranged in the left-right direction are arranged three in the front-rear direction, and a cooling jacket 132*a* for cooling a set of two battery modules at a second stage is disposed on the frontmost row cooling jackets 132*a*. Upstream sides of these four cooling jackets 132*a* are connected in parallel via a third internal piping 104*c*, and downstream sides of these cooling jackets 132*a* are connected in parallel via a fourth internal piping 104*d*. Incidentally, the cooling jacket 132*a* in the second stage and the three cooling jackets 132*a* in a first stage are described to be arranged together in FIG. 4.

A rear module group cooling unit 133 for cooling the rear module group 33 is configured such that cooling jackets 133*a* for cooling each battery module 30*a* in a first stage are arranged four in the left-right direction, and cooling jackets 133*a* for cooling each battery module 30*a* in a second stage thereon are arranged four in the left-right direction. Upstream sides of these eight cooling jackets 133*a* are connected in parallel via a fifth internal piping 104*e*, and downstream sides of these cooling jackets 133*a* are connected in parallel via a sixth internal piping 104*f*. Incidentally, the four cooling jackets 133*a* in the second stage and the four cooling jackets 133*a* in the first stage are described to be arranged together in FIG. 4.

In the battery cooling unit 130, the plurality of module group cooling units 131 to 133 are disposed in series. Specifically, an outlet port 133*c* of the rear module group cooling unit 133 is connected to an inlet port 132*b* of the middle module group cooling unit 132 via a seventh internal piping 104*g* and a fifth external piping 103*e*, and an outlet port 132*c* of the middle module group cooling unit 132 is connected to an inlet port 131*b* of the front module group cooling unit 131 via an eighth internal piping 104*h*.

The DC-DC converter cooling unit 122 is a cooling jacket which is incorporated in the DC-DC converter 22 or a cooling jacket which is disposed adjacent to the DC-DC converter 22, and the charger cooling unit 121 is a cooling jacket which is incorporated in the charger 21 or a cooling jacket which is disposed adjacent to the charger 21. The DC-DC converter cooling unit 122 and the charger cooling unit 121 are connected to each other in series and are disposed at a downstream side of the battery cooling unit 130.

Specifically, an inlet port 122*a* of the DC-DC converter cooling unit 122 is connected to an outlet port 131*c* of the front module group cooling unit 131 which is an outlet port of the battery cooling unit 130 via a ninth inner piping 104*i*, and an outlet port 122*b* of the DC-DC converter cooling unit 122 is connected to an inlet port 121*a* of the charger cooling unit 121 via a tenth internal piping 104*j* and a sixth external piping 103*f*.

In the cooling circuit 100, in connecting the DC-DC converter cooling unit 122 and the charger cooling unit 121 in series, the charger cooling unit 121 for cooling the charger 21 which has a greater heat value than that of the DC-DC converter 22 is disposed at a downstream side of the DC-DC converter cooling unit 122 for cooling the DC-DC converter 22. In general, since a heat value of a charger is greater than that of a DC-DC converter, the DC-DC converter cooling unit 122 and the charger cooling unit 121 are connected in series in this order from the upstream side thereof, so that the DC-DC converter 22 having a smaller heat value is firstly cooled. Accordingly, the cooling efficiency can be enhanced.

Further, in the cooling circuit 100, a bypass flow path 105 is provided which connects an upstream side of the battery cooling unit 130 to an upstream side of the high-voltage equipment cooling unit 120 (the DC-DC converter cooling unit 122 and the charger cooling unit 121) and the downstream side of the battery cooling unit 130. Specifically, a connecting portion between the third external piping 103*c* and the fourth external piping 103d is referred to as a branch portion 114, and the branch portion 114 is connected to the outlet port 131c of the front module group cooling unit 131 which is the outlet port of the battery cooling unit 130 via a seventh external piping 103g which configures the bypass flow path 105. Then, a three-way solenoid valve 106, which functions as a flow path switching device, is provided at the branch portion 114.

When the three-way solenoid valve 106 is off, the third external piping 103c and the fourth external piping 103d are connected such that the refrigerant discharged from the cooling pump 102 is supplied to the battery cooling unit 130, while the third external piping 103c is disconnected from the bypass flow path 105 (the seventh external piping 103g) such that the direct supply of the refrigerant to the high-voltage equipment cooling unit 120 (the DC-DC converter cooling unit 122 and the charger cooling unit 121) is cut off. When the three-way solenoid valve 106 is on, the third external piping 103c and the bypass flow path 105 (the seventh external piping 103g) are connected such that the refrigerant discharged from the cooling pump 102 is directly supplied to the high-voltage equipment cooling unit 120 (the DC-DC converter cooling unit 122 and the charger cooling unit 121), while the third external piping 103c is disconnected from the fourth external piping 103d such that the supply of the refrigerant to the battery cooling unit 130 is cut off. Incidentally, in FIG. 4, arrows denote flows of the refrigerant, and there is no such situation where both the fourth external piping 103d and the bypass flow path 105 (the seventh external piping 103g) are connected to the third external piping 103c.

As shown in FIG. 4, among the external pipings 103 disposed outside the first battery unit 10 and the second battery unit 60, the fourth external piping 103d, the fifth external piping 103e, the sixth external piping 103f, and the seventh external piping 103g are disposed at one vehicle width side of the first battery unit 10 (in FIG. 4, a left side in the vehicle width direction). In other words, the external pipings 103 are not provided at another vehicle width side of the first battery unit 10 (in FIG. 4, a right side in the vehicle width direction). For example, in the hybrid vehicle or the like, an exhaust pipe extending from an engine disposed in the engine room 7 at the front of the vehicle to the rear of the vehicle is preferably disposed at the other vehicle width side of the first battery unit 10 (in FIG. 4, the right side in the vehicle width direction). Therefore, the external pipings 103 in the cooling circuit 100 can be prevented from being heated up by heat caused by the exhaust pipe.

FIG. 5 is a schematic block diagram of the cooling circuit 100 which is described in detail by using FIG. 4. In FIG. 5, CHG denotes the charger cooling unit 121, DCDC denotes the DC-DC converter cooling unit 122, and BATT denote the module group cooling units 131 to 133 (the same in FIGS. 6 to 9 described below).

As shown in FIG. 5, in the cooling circuit 100 of this embodiment, the radiator 101, the cooling pump 102, the battery cooling unit 130, and the high-voltage equipment cooling unit 120 configured by the charger cooling unit 121 and the DC-DC cooling unit 122 are connected in series, and the high-voltage equipment cooling unit 120 is disposed at the downstream side of the battery cooling unit 130. In addition, the upstream side of the battery cooling unit 130 is connected to the upstream side of the high-voltage equipment cooling unit 120 and the downstream side of the battery cooling unit 130 by the bypass flow path 105, and the three-way solenoid valve 106 is provided at the branch portion 114 where the bypass flow path 105 branches off from an upstream-side flow path of the battery cooling unit 130. Further, the battery cooling unit 130 includes the three module group cooling units 131 to 133 which are connected in series, and the high-voltage equipment cooling unit 120 includes the DC-DC converter cooling unit 122 and the charger cooling unit 121 which are connected in series.

[Air-Venting Mechanism]

Herein, an air-venting mechanism 80 is provided in the cooling circuit 100 (the interior cooling circuit 100A). As shown in FIG. 4, the air-venting mechanism 80 includes an air-venting flow path 83 which branches off from the interior cooling circuit 100A, an air-venting piping 84 which connects to the air-venting flow path 83, and the air-venting bolt 81 which is provided in a tip end part of the air-venting piping 84. Specifically, an eleventh internal piping 104k, as the air-venting flow path 83 which connects the inlet port 132b of the middle module group cooling unit 132 to the outlet port 132c thereof, is provided in parallel with the four cooling jackets 132a, and the air-venting piping 84 is connected to the air-venting flow path 83 (the eleventh internal piping 104k).

Figure 9:
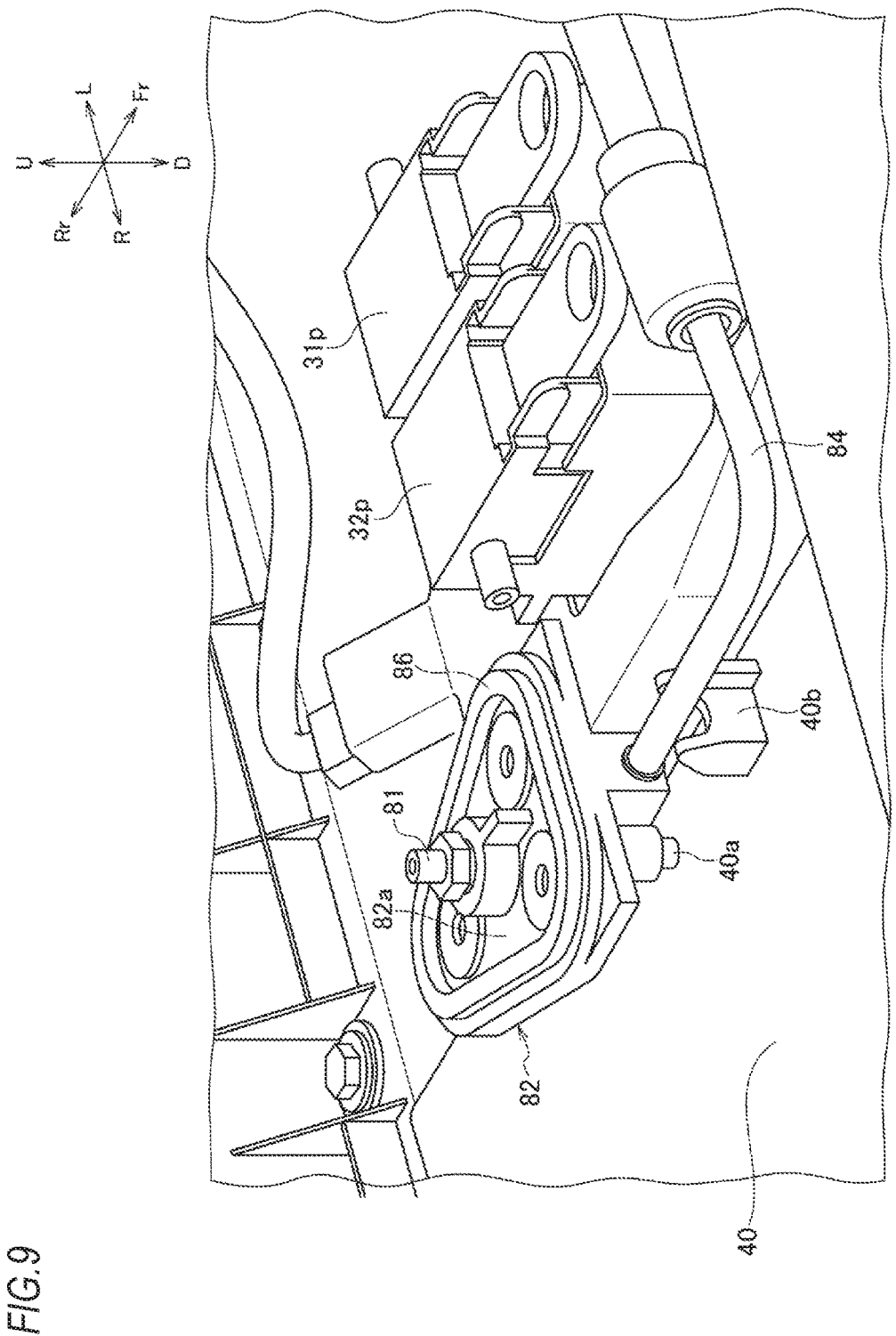
FIG. 9 is a perspective view of an air-venting bolt, a first maintenance inspection plug, and a second maintenance inspection plug provided in the first battery unit.

The air-venting bolt 81 is disposed to pass through a highest position in the cooling circuit 100 along with the air-venting flow path 83 (the eleventh internal piping 104k) and the air-venting piping 84. A flow path area of a connection portion 85 of the air-venting flow path 83 (the eleventh internal piping 104k) and the air-venting piping 84 is larger than those of flow paths at an upstream side and a downstream side of the connection portion 85, and a flow rate of the refrigerant passing through the connection portion 85 is smaller than those of the refrigerant passing through the flow paths at the upstream side and the downstream side of the connection portion 85. Therefore, it is possible to reduce the flow of air having entered the cooling circuit 100 and floated in the air-venting piping 84 passing through the air-venting piping 84 with the flow of the refrigerant. As shown in FIG. 9, after passing a front of the first maintenance inspection plug 31p and the second maintenance inspection plug 32p above the left battery ECU 40 from the left side, the air-venting piping 84 bends rearward above the right battery ECU 40.

The tip end part of the air-venting piping 84 is supported by the stay 82 having a cross section of T-shape, and the stay 82 and the air-venting piping 84 are respectively positioned by positioning portions 40a and 40b formed on an upper surface of the right battery ECU 40.

The air-venting bolt 81 connected to the air-venting piping 84, and a seal member 86 surrounding the air-venting bolt 81 are provided on an upper surface 82a of the stay 82. The bottom plate 51 on which the front module group 31, the middle module group 32, and the DC-DC converter 22 are mounted is covered by the cover 52, so that the air-venting bolt 81 is exposed to the outside from a cover through hole 52c (see FIG. 2) formed on the cover 52.

That is, the air-venting bolt 81 is disposed to the cover through hole 52c from an inner side of the cover 52. As shown in FIGS. 7 and 8, the stay 82 is fastened to the cover 52 from an outer side of the cover 52 via a plurality of bolts 88 (three in the embodiment). Accordingly, since a bolt head of the air-venting bolt 81 is exposed to the outer side of the cover 52 and the seal member 86 is in tight contact with a back surface of the cover 52, communication between the inside and the outside of the cover 52 is blocked. The air-venting bolt 81 is maintained in a closed state where communication between the air-venting piping 84 and the outside is blocked at a time other than maintenance. In maintenance, by rotating the bolt head from the outer side of the cover 52 in a predetermined direction, the air-venting piping 84 is communicated with the outside, and the air accumulated in the cooling circuit 100 is discharged from a through hole provided in the bolt head. That is, the air-venting bolt 81 is disposed to the cover through hole 52c from the inner side of the cover 52 and is configured such that the air can be discharged from the outer side of the cover 52.

[Air Discharging (Air-Venting) Operation]

When the air accumulated in the cooling circuit 100 is to be discharged, the maintenance lid 3b for sealing the first panel opening portion 3a of the floor panel 3 is removed after the rear seat 5 is removed. Subsequently, in a state where the first cover opening portion 52a is sealed by the maintenance lid 52b, the air accumulated in the air-venting piping 84 is discharged from the air-venting bolt 81 by rotating the air-venting bolt 81 in the predetermined direction to cause the air-venting piping 84 to communicate with the outside. At this time, since the outside of the cover 52 is separated from the inside thereof by the seal member 86, the refrigerant does not enter the inside of the cover 52 even if the refrigerant in the cooling circuit 100 is discharged from the air-venting bolt 81.

[Summary]

As described above, according to the embodiment, the air-venting bolt 81 provided in the cooling circuit 100 is disposed to the cover through hole 52c of the cover 52 from the inner side of the cover 52, and it is possible to perform the air discharging operation from the outer side of the cover 52. Therefore, the air accumulated in the cooling circuit 100 can be easily discharged from the outer side of the cover 52 via the air-venting bolt 81. Since the air-venting bolt 81 is provided from the inner side of the cover 52, in replacement or maintenance of the battery 30, the cover 52 can be removed and the battery 30 can be easily accessed in a state where the air-venting bolt 81 is mounted in the cooling circuit 100.

Since the seal member 86 is provided between the stay 82 for supporting the air-venting bolt 81 and the cover 52, the battery 30 can be prevented from being wet even if the refrigerant is scattered during air discharging.

Since the air-venting bolt 81 is disposed adjacent to the maintenance inspection plugs 31p and 32p, the air can be discharged and electricity input and output of the battery 30 can be blocked from one panel opening portion 3a.

Since the air-venting bolt 81 is disposed below the rear seat 5 and in a vehicle width center part, the air-venting bolt 81 and the maintenance inspection plugs 31p and 32p can be easily accessed by removing the rear seat 5.

Since the air-venting bolt 81 is disposed in the highest position in the cooling circuit 100, the air in the cooling circuit 100 can be efficiently collected in the air-venting piping 84. Further, since the flow rate of the connection portion 85 of the air-venting piping 84 and the air-venting flow path 83 is smaller than those of the flow paths at the upstream side and the downstream side of the connection portion 85, it is possible to reduce the flow of air having entered the cooling circuit 100 passing through the air-venting piping 84 with the flow of the refrigerant in the cooling circuit 100.

Since the air-venting piping 84 is positioned by the positioning portion 40b which is provided on the battery ECU 40 covered by the cover 52, the air-venting piping 84 can be easily disposed, and workability is improved.

Since the fourth external piping 103d, the fifth external piping 103e, the sixth external piping 103f, and the seventh external piping 103g among the external pipings 103 are only disposed at the one vehicle width side of the first battery unit 10, the pipings can be assembled easily.

The DC-DC converter 22, and the high-voltage wiring (not shown) for connecting the front module group 31 and the middle module group 32 to the DC-DC converter 22 are disposed at the vehicle width center of the first battery unit 10, so that the DC-DC converter 22 and high-voltage wiring can be protected from an impact at a side collision. Since the DC-DC converter 22 and the high-voltage wiring are away from the fourth external piping 103d, the fifth external piping 103e, the sixth external piping 103f, and the seventh external piping 103g which are disposed at the one vehicle width side of the first battery unit 10, the DC-DC converter 22 and high-voltage wiring can also be protected from being wet.

[Modification]

The present invention is not limited to the embodiment described above and can be modified or improved as required.

For example, in the above-described embodiment, the battery 30 is divided into the front module group 31, the middle module group 32, and the rear module group 33, the front module group 31 and the middle module group 32 are disposed in the first battery unit 10, the rear module group 33 is disposed in the second battery unit 60, and the module groups 31 to 33 are all cooled by the cooling circuit 100. However, other cooling circuits may be provided for the battery units 10 and 60, respectively. In this case, air-venting mechanisms are preferably provided in the cooling circuits respectively.

Further, the cooling circuit 100 of the above-described embodiment may be a water-cooled cooling circuit which utilizes water as a refrigerant or an oil-cooled cooling circuit which utilizes oil as a refrigerant.

The invention claimed is:

1. A vehicle comprising:
an electric device;
a cover which is configured to cover the electric device; and
a cooling circuit which is configured to cool the electric device with a refrigerant,
wherein an air-venting member is provided in the cooling circuit,
wherein a cover through portion is provided in the cover, and
wherein the air-venting member is disposed to the cover through portion from an inner side of the cover and is configured such that an air discharging operation is performed from an outer side of the cover.

2. The vehicle according to claim 1,
wherein the air-venting member is supported by a stay, and
wherein a seal member is provided between the stay and the cover.

3. The vehicle according to claim 1,
wherein the electric device is disposed below a floor panel,
wherein the floor panel is formed with a panel opening portion,
wherein a maintenance inspection plug for blocking electricity input and output of the electric device is provided adjacent to the air-venting member, and
wherein the air-venting member and the maintenance inspection plug are operable through the panel opening portion.

4. The vehicle according to claim 3,
wherein the air-venting member is disposed below a rear seat at a vehicle width center part.

5. The vehicle according to claim 1,
wherein the air-venting member is disposed at a highest position in the cooling circuit.

6. The vehicle according to claim 5,
wherein an air-venting piping connected to the air-venting member is connected to an air-venting flow path branching off from the cooling circuit, and
wherein a flow rate of a connection portion of the air-venting piping and the air-venting flow path is smaller than those of flow paths at an upstream side and a downstream side of the connection portion.

7. The vehicle according to claim 1,
wherein an air-venting piping connected to the air-venting member is connected to an air-venting flow path branching off from the cooling circuit, and
wherein the air-venting piping is positioned by a positioning portion provided in another electric device covered by the cover.

8. The vehicle according to claim 1,
wherein the electric device includes a first module group having a plurality of battery modules, and a second module group having a plurality of battery modules,
wherein the first module group, the second module group, and a battery case for accommodating the first module group and the second module group configure a battery unit,
wherein the battery case includes a bottom plate on which the first module group and the second module group are mounted, and a unit cover which is configured to cover the bottom plate from above,
wherein the cover is the unit cover, and
wherein the battery unit is disposed below a floor panel.

9. The vehicle according to claim 8,
wherein the cooling circuit includes a cooling internal piping provided inside the battery unit, and a cooling external piping provided outside the battery unit,
wherein at least a part of the cooling external piping is disposed at one vehicle width side of the battery unit, and
wherein the cooling external piping is not provided at another vehicle width side of the battery unit.

10. The vehicle according to claim 9,
wherein an exhaust pipe is provided at the other vehicle width side of the battery unit.

11. The vehicle according to claim 9,
wherein a high-voltage equipment and a high-voltage wiring for connecting the high-voltage equipment to the first module group and the second module group are provided in the battery unit, and
wherein the high-voltage equipment and the high-voltage wiring are disposed at a vehicle width center of the battery unit.

* * * * *